United States Patent [19]

Takino et al.

[11] Patent Number: 5,259,191

[45] Date of Patent: Nov. 9, 1993

[54] TORQUE CONVERTER

[75] Inventors: Takashi Takino, Higashi-Hiroshima; Tokimori Saka, Hiroshima, both of Japan

[73] Assignee: Mazda Motor Corporation, Hiroshima, Japan

[21] Appl. No.: 851,299

[22] Filed: Mar. 11, 1992

[30] Foreign Application Priority Data

Mar. 20, 1991 [JP] Japan .................................. 3-56975

[51] Int. Cl.⁵ .......................................... F16D 33/00
[52] U.S. Cl. .................................. 60/361; 416/197 C
[58] Field of Search ............. 60/330, 361; 416/197 C; 566/566

[56] References Cited

U.S. PATENT DOCUMENTS

| | | | |
|---|---|---|---|
| 2,801,521 | 8/1957 | Jandasek | 60/361 |
| 3,873,237 | 3/1975 | Tokunaga | 416/197 CX |
| 5,168,702 | 12/1992 | Sakakibara et al. | 60/361 X |

FOREIGN PATENT DOCUMENTS

| | | | |
|---|---|---|---|
| 60-260765 | 12/1985 | Japan . | |
| 520424 | 4/1940 | United Kingdom | 60/330 |

Primary Examiner—Edward K. Look
Assistant Examiner—Todd Mattingly
Attorney, Agent, or Firm—Keck, Mahin & Cate

[57] ABSTRACT

A torque converter is provided for transmitting torque from an engine output shaft to an input shaft of a transmission. The torque converter includes a pump, connected with the engine output shaft, which includes a shell portion disposed at an outer portion thereof, a core portion disposed at an inner portion thereof and a plurality of blades disposed between the shell portion and the core portion. A turbine is disposed facing the pump and is driven by the pump through hydraulic fluid. The turbine includes a shell portion disposed at an outer portion thereof, a core portion disposed at an inner portion thereof and a plurality of blades disposed between the shell portion and the core portion. A stator is disposed between the pump and the turbine for torque amplification. The core portion and blades of the turbine include respective radial outer edges, the core portion and blades of the pump include respective radial outer edges, and the radial outer edges of the blades of at least one of the pump and the turbine project beyond the radial outer edge of the core portion thereof toward the facing blades of the other.

5 Claims, 3 Drawing Sheets

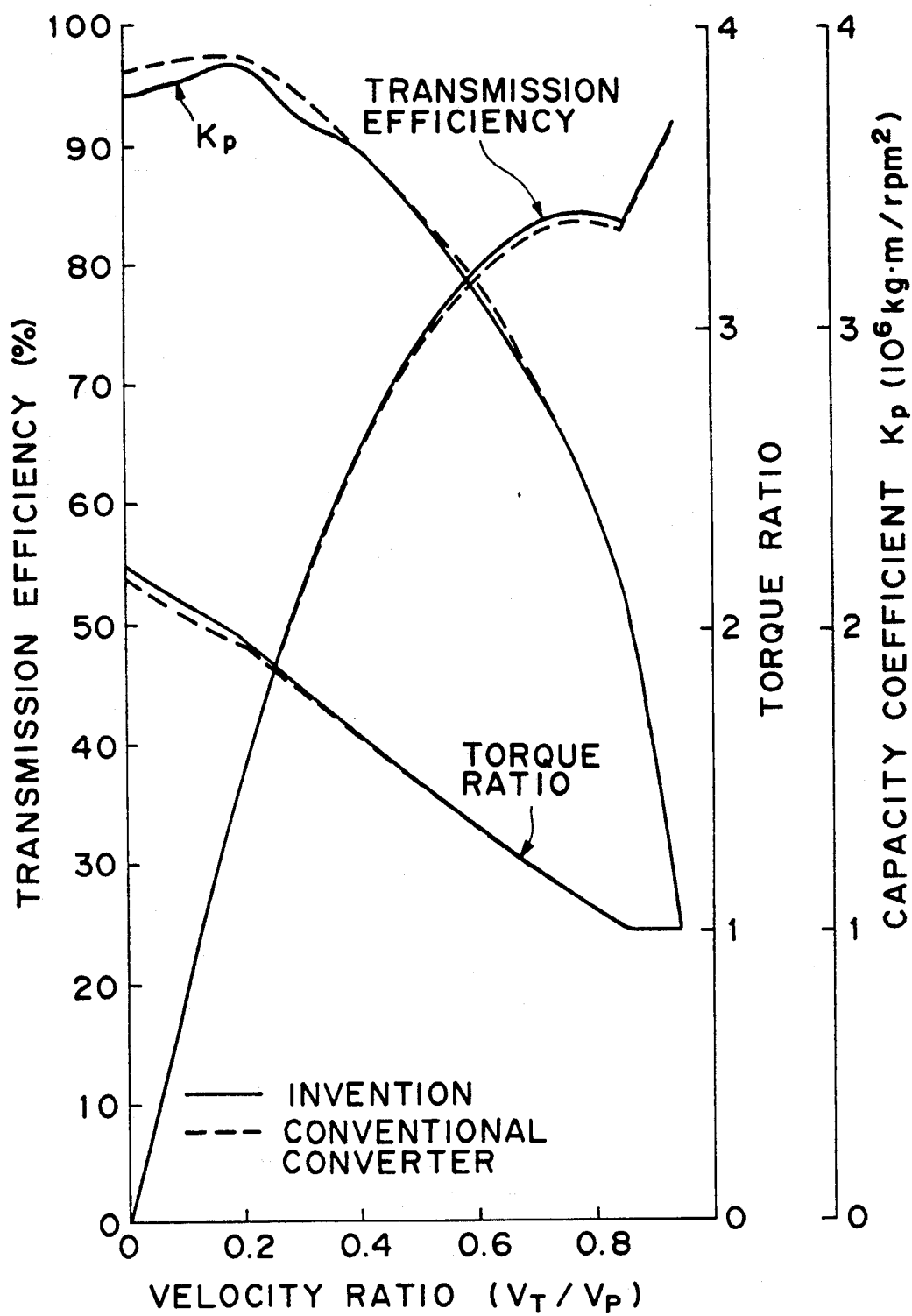

TORQUE CONVERTER

BACKGROUND OF THE INVENTION

1. Field of the Invention

The present invention relates to a torque converter and, in particular, to a torque converter used in an automatic transmission of a motor vehicle.

2. Description of Related Art

A conventional torque converter used in an automatic transmission is provided with a pump, a turbine and a stator located between the pump and turbine. The pump and turbine each has a plurality of blades and a core which supports the inner ends of the blades. As shown in Japanese Patent Laid-Open Publication No. 60-260765, in the conventional torque converter, the pump core projects slightly beyond the radial outer edges of the pump blades toward the turbine and the turbine core projects slightly beyond the radial outer edges of the turbine blades toward the pump.

The capacity coefficient $K_P$ representing the performance of the torque converter is given by the following equation:

$$K_P = T_{IN}/(N_E/1000)^2$$

where $T_{IN}$ is is the torque applied to an input shaft of the torque converter and $N_E$ is the rotational speed of the input shaft of the torque converter or the engine speed. As shown in the above equation, the capacity coefficient $K_P$ represents a relationship between $T_{IN}$ and $N_E$, and it will be understood that for one and the same speed $N_E$ of the input shaft of the torque converter, the larger the capacity coefficient $K_P$ is, the larger the torque $T_{IN}$ applied to the torque converter will be.

Hydraulic fluid contained in the torque converter is caused to fly outward along the core of the pump by centrifugal force. The fluid flows into the turbine from the pump, generates a torque to rotate the turbine, and returns to the pump through the stator. By the circulation of the hydraulic fluid described above, the torque converter can transmit torque from the pump to the turbine, namely from the engine to the automatic transmission. The larger the velocity of the circulation of the hydraulic fluid is, the larger the transmitted torque or capacity coefficient $K_P$ is. On the other hand, the smaller the velocity of the circulation of the hydraulic fluid is, the smaller the transmitted torque or the capacity coefficient $K_P$ is.

The velocity of the hydraulic fluid becomes large when the velocity ratio between the turbine velocity and the pump velocity is small, and decreases as the velocity ratio increases.

Therefore, the capacity coefficient $K_P$ is large in regions where the speed ratio is small, such as at and near the idling region, and becomes smaller as the velocity ratio becomes larger or the engine speed becomes higher.

The capacity coefficient $K_P$ can be controlled by controlling the velocity of the circulation of the hydraulic fluid. If the capacity coefficient $K_P$ could be decreased at and near the idling region by controlling the velocity of the circulation of the hydraulic fluid, fuel consumption could be improved in such regions. It might be throught that this could be achieved by, for example, a torque converter in which the pump and the turbine are provided with blades having projections on their surfaces so as to decrease the capacity coefficient $K_P$ in such regions.

However, a torque converter of this type could be disadvantageous in that the capacity coefficient $K_P$ in regions where the speed ratio is large, namely, in the driving (running) region, would decrease in comparison with the conventional torque converter with no projections on the surfaces of the blades and, therefore, acceleration performance would decrease in the driving region.

SUMMARY OF THE INVENTION

It is, therefore, an object of the present invention to provide a torque converter which has a smaller capacity coefficient $K_P$ in the idling region than a conventional torque converter and has a capacity coefficient $K_P$ in the driving region of the same level as the conventional torque converter.

The above object is achieved according to the present invention, by providing a torque converter for transmitting torque from an engine output shaft to an input shaft of a transmission comprising a pump connected with the engine output shaft, including a shell portion disposed at an outer portion thereof, a core portion disposed at an inner portion thereof and a plurality of blades disposed between the shell portion and the core portion. A turbine is disposed facing the pump and driven by the pump through hydraulic fluid. The turbine includes a shell portion disposed at an outer portion thereof, a core portion disposed at an inner portion thereof and a plurality of blades disposed between the shell portion and the core portion. A stator is disposed between the pump and the turbine for torque amplifiction. The core portion and blades of the turbine include respective radial outer edges, and the core portion and blades of the pump include respective radial outer edges. The radial outer edges of the blades of at least one of the pump and the turbine project beyond the radial outer edge of the core portion thereof toward the facing blades of the other.

Preferably, the radial outer edges of the blades of the turbine project beyond the radial outer edge of the core portion thereof toward the facing blades of the pump.

The radial outer edges of the blades of the pump also preferably project beyond from the radial outer edge of the core portion thereof toward the facing blades of the turbine.

Further, the radial outer edges of the blades of the turbine preferably project beyond the radial outer edge of the core portion thereof toward the facing blades of the pump, and the radial outer edges of the blades of the pump project beyond the radial outer edge of the core portion thereof toward the facing blades of the turbine.

The present invention was achieved based on the observation that the pressure difference between the radial outer and the inner portions of the core of a converter is large in the large velocity ratio region of the circulation flow of the hydraulic fluid in the torque converter because of the centrifugal force of the torque converter, and the pressure difference is small in the small velocity ratio region of the circulation flow in the torque converter.

The present invention, therefore, controls the circulation flow of the hydraulic fluid in the torque converter by utilizing the radial flow generated by the pressure difference.

According to the present invention, the radial outer edges of the blades of at least one of the pump and the turbine project beyond the radial outer edge of core portion thereof toward the facing radial outer edges of the blades of the other. Therefore, the hydraulic fluid can flow more easily in the radial direction in comparison with the conventional torque converter in which the radial outer edge of the core portion extends as far as the radial outer edges of the blades in both the pump and turbine. As a result, in the small velocity ratio region where the pressure difference between the radial outer and the inner portions of the core of the converter is large, a radial flow is generated by the pressure difference and the circulation flow in the torque converter is disturbed by the radial flow, whereby the capacity coefficient of the torque converter in accordance with the present invention becomes smaller than that of a conventional torque converter in the low velocity region. On the other hand, in the large velocity ratio region where the pressure difference is small, the radial flow generated by the pressure difference is minute and, therefore, the circulation flow in the torque converter is not disturbed by the radial flow. As a result, in the large velocity ratio region, the capacity coefficient of the torque converter in accordance with the present invention is substantially same as that of the conventional torque converter.

BRIEF DESCRIPTION OF THE DRAWINGS

FIG. 3 is a graphical representation showing the performances of the present invention and the conventional torque converter.

DETAILED DESCRIPTION OF THE PREFERRED EMBODIMENT

The present invention will now be explained with reference to the preferred embodiment and the drawings.

Figure 1:
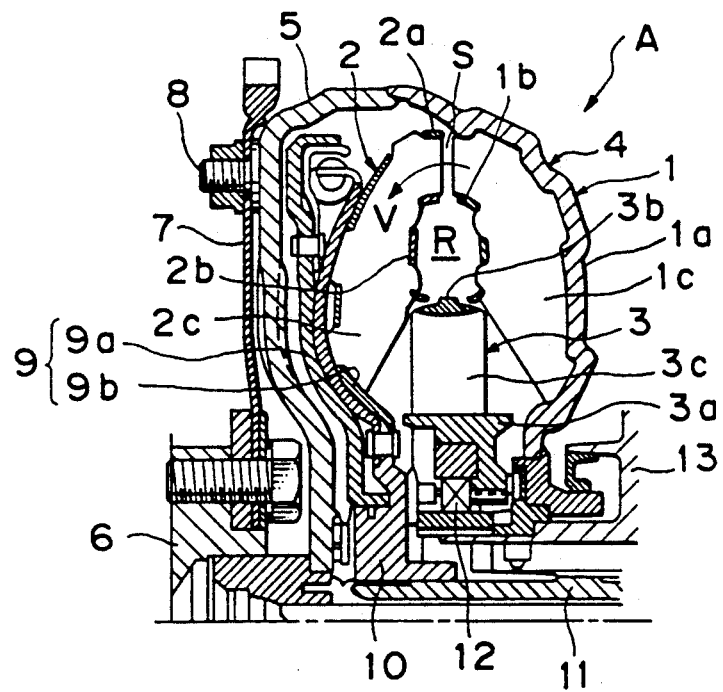
FIG. 1 is a sectional view of a torque converter showing an embodiment of the present invention.
Figure 2:
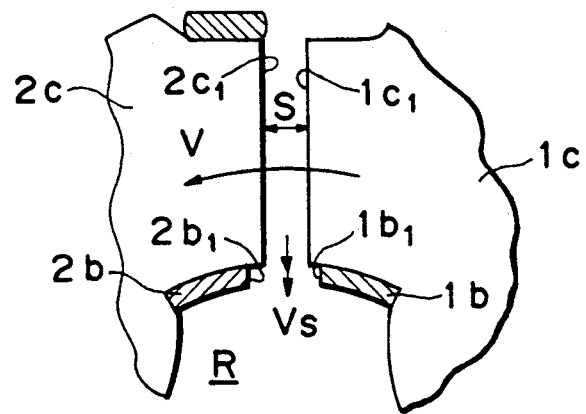
FIG. 2 is an enlarged partial sectional view of FIG. 1.

As is seen in FIG. 1 and FIG. 2, a torque converter A is provided with a torus 4 which includes a pump 1, a turbine 2 and a stator 3 located between the pump 1 and the turbine 2. The pump 1 includes a shell portion $1a$ formed as an outer portion of the torus 4, a core portion $1b$ formed as an inner portion of the torus 4, and a plurality of blades $1c$ disposed between the shell portion $1a$ and the core portion $1b$. Similarly, the turbine 2 includes a shell portion $2a$ formed as an outer portion of the torus 4, a core portion $2b$ formed as an inner portion of the torus 4, and a plurality of blades $2c$ disposed between the shell portion $2a$ and the core portion $2b$. The radial outer edges $1c_1$ of the blades $1c$ of the pump 1 and the radial outer edges $2c_1$ of the blades $2c$ of the turbine 2 are disposed so as to face each other across a predetermined clearance or space S. The radial outer edge $1b_1$ of the core portion $1b$ of the pump 1 adjacent to the radial outer edges $1c_1$ of the blades $1c$ does not reach the radial outer edges $1c_1$ of the blades $1c$ but terminates before the radial outer edges $1c_1$. Similarly, the radial outer edge $2b_1$ of the core portion $2b$ of the turbine 2 adjacent to the radial outer edges $2c_1$ of the blades $2c$ does not reach the radial outer edges $2c_1$ of the blades $2c$ but terminates before the the radial outer edges $2c_1$. Specifically, radial outer edges $1c_1$ of the blades $1c$ of the pump 1 project beyond from the radial outer edge $1b_1$ of the core portion $1b$ toward the facing radial outer edges $2c_1$ of the blades $2c$ of the turbine 2. On the other hand, the radial outer edges $2c_1$ of the blades $2c$ of the turbine 2 project beyond the radial outer edge $2b_1$ of the core portion $2b$ toward the facing radial outer edges $1c_1$ of the blades $1c$ of the pump 1.

The shell portion $1a$ of the pump 1 is connected to a front cover 5 which is disposed on the back or engine side of the turbine 2. A drive plate 7 is connected to a crankshaft 6 of the engine, and secured to the front cover 5 by bolts 8. Between the front cover 5 and the turbine 2 is disposed a lock-up clutch 9 which includes a clutch plate $9a$, capable of engaging or disengaging the inner surface of the front cover 5, and a damper member $9b$ for absorbing shocks generated when the clutch plate $9a$ engages the front cover 5. The lock-up clutch 9 is integrated with the shell portion $2a$ of the turbine 2 and is secured to a turbine boss 10 which is splined to a shaft 11, namely, the input shaft of an automatic transmission.

The stator 3 includes a boss portion $3a$, a ring plate $3b$ and a plurality of blades $3c$. The boss portion $3a$ is connected with a housing 13 through a one-way clutch 12 which enables the stator 3 to ratate in the same direction as the turbine 2.

In the above-mentioned torque converter A, the pump 1 is driven by the engine ( not shown ). The rotation of the pump 1 forces the hydraulic fluid in the torque converter A to circulate as shown by arrows in FIGS. 1 and 2, and the turbine 2 transmits a driving force to the shaft 11, while the stator 3 multiplies the driving force transmitted to the shaft 11.

As explained above, the velocity V of the hydraulic fluid flow as shown by the arrow decreases and increases according to the velocity ratio $V_T/V_P$, i.e., the ratio of a velocity $V_T$ of the turbine 2 and the velocity $V_P$ of the pump 1. That is, the velocity V of the hydraulic fluid is large in regions where the velocity ratio is small, such as the idling region, and is small in regions where the velocity ratio is large, such as the driving region. As a result, the capacity coefficient $K_P$ is large in the idling region and small in the driving region.

A space S is present between the radial outer edges $1c_1$ of the blades $1c$ of the pump 1 and the radial outer edges $2c$ of the blades $2c$ of the turbine 2 and a space R is enclosed by the core portion $1b$ of the pump 1 and the core portion $2b$ of the turbine 2. By the circulation of the hydraulic fluid as shown by the arrow, a pressure difference is generated between the space S and the space R and causes the hydraulic fluid to flow at a velocity $V_S$ from the space S to the space R as shown by a double arrow in FIG. 2. The pressure difference increases and decreases as the velocity V of the hydraulic fluid increases and decreases. Therefore, the pressure difference between the space S and the space R becomes large and the velocity $V_S$ of the radial flow shown by the double arrow becomes large in the idling region. On the other hand, the pressure difference becomes small and the velocity V s becomes small in the driving region. As a result, in the idling region, because the circulation flow shown by the arrow is disturbed by the radial flow shown by the double arrow, the capacity coefficient $K_P$ of the torque converter A decreases. On the other hand, in the driving region, because the circulation flow is not disturbed by the radial flow, the capacity coefficient $K_P$ does not decrease.

According to the embodiment of the invention described above, the radial outer edges $1c_1$ of the blades $1c$ of the pump 1 project beyond the radial outer edge $1b_1$ of the core portion $1b$ toward the facing radial outer edges $2c_1$ of the blades $2c$ of the turbine 2. On the other hand, the radial outer edges $2c_1$ of the blades $2c$ of the turbine 2 project beyond from the radial outer edge $2b_1$ of the core portion $2b$ toward the facing radial outer edges $1c_1$ of the blades $1c$ of the pump 1. As a result, in the torque converter of the illustrated embodiment, the hydraulic fluid can flow more easily in the direction shown by the double arrow in comparison with a conventional torque converter in which the radial outer edge $1b_1$ of the core portion $1b$ extends as far as the the radial outer edges $1c_1$ of the blades $1c$ and the radial outer edge $2b_1$ of the core portion $2b$ extends as far as the the radial outer edges $2c_1$ of the blades $2c$. Therefore, the capacity coefficient $K_P$ of the torque converter A in accordance with the embodiment becomes smaller in the idling region than that of the conventional torque converter. As a result, fuel consumption can be reduced in the idling region. On the other hand, in the driving region, because the velocity $V_S$ shown by the double arrow is relatively small, a capacity coefficient $K_P$ of the same level as the conventional torque converter can be obtained. As a result, good acceleration performance can be realized.

Referring to FIG. 3, there is shown a graphical representation of performances of the illustrated embodiment of the present invention and the conventional torque converter. As can be clearly seen in FIG. 3, in the idling region, the capacity coefficient $K_P$ of the torque converter according to the illustrated embodiment is smaller than that of the conventional torque converter. On the other hand, in the driving region, there is no substantial difference in the capacity coefficient $K_P$ between the illustrated embodiment and the conventional torque converter. FIG. 3 also showes the torque ratio, namely a ratio between the turbine torque and the pump torque, and the transmission efficiency of the illustrated embodiment and the conventional torque converter. Here, the continuous lines show those of the illustrated embodiment of the present invention and the dashed lines show those of the conventional torque converter. It can be understood that the torque converter of the illustrated embodiment has better performance as regards torque ratio and transmission efficiency than the conventional torque converter.

In the present invention, the torqe converter may be provided with either of radial outer edges $1c_1$ and $2c_1$ projecting beyond the radial outer edge of the corresponding core portion.

Although the present invention has been explained with reference to a specific, preferred embodiment, one of ordinary skill in the art will recognize that modifications and improvements can be made while remaining within the scope and spirit of the present invention. The scope of the present invention is determined solely by appended claims.

What is claimed is:

1. A torque converter for transmitting torque from an engine output shaft to an input shaft of a transmission comprising:
   a pump connected with the engine output shaft, said pump including a shell portion disposed at an outer portion thereof, a core portion disposed at an inner portion thereof and a plurality of blades disposed between the shell portion and the core portion;
   a turbine disposed facing the pump and driven by the pump through hydraulic fluid, said turbine including a shell portion disposed at an outer portion thereof, a core portion disposed at an inner portion thereof and a plurality of blades disposed between the shell portion and the core portion; and
   a stator disposed between the pump and the turbine for torque amplification;
   said core portion and blades of the turbine respectively including a radial outer edge and radial outer edges, said core portion and blades of the pump respectively including a radial outer edge and radial outer edges, said radial outer edges of the blades of at least one of the pump and the turbine projecting beyond the radial outer edge of the core portion thereof toward the blades of the other of the pump and the turbine so that a first distance between the radial outer edge of the core portion of the pump and the radial outer edge of the core portion of the turbine is greater than a second distance between the radial outer edges of the blades of the pump and the radial outer edges of the blades of the turbine.

2. A torque converter as recited in claim 1, wherein the radial outer edges of the blades of the turbine project beyond the radial outer edge of the core portion thereof toward the blades of the pump.

3. A torque converter as recited in claim 1, wherein the radial outer edges of the blades of the pump project beyond the radial outer edge of the core portion thereof toward the blades of the turbine.

4. A torque converter as recited in claim 1, wherein the radial outer edges of the blades of the turbine project beyond the radial outer edge of the core portion thereof toward the blades of the pump, and the radial outer edges of the blades of the pump project beyond the radial outer edge of the core portion thereof toward the blades of the turbine.

5. A torque converter for transmitting torque from an engine output shaft to a transmission comprising:
   a pump connected with the engine output shaft, said pump including a shell portion disposed at an outer portion thereof, a core portion disposed at an inner portion thereof and a plurality of blades disposed between the shell portion and the core portion, said core portion and blades of the pump respectively including a radial outer edge and radial outer edges;
   a turbine disposed facing the pump and driven by the pump through hydraulic fluid circulating in the pump and the turbine, said turbine including a shell portion disposed at an outer portion thereof, a core portion disposed at an inner portion thereof and a plurality of blades disposed between the shell portion and the core portion, said core portion and blades of the turbine respectively including a radial outer edge and radial outer edges;
   a stator disposed between the pump and the turbine for torque amplification; and
   means for controlling an amount of the hydraulic fluid flowing from a first space provided between the radial outer edges of the blades of the pump and the radial outer edges of the blades of the pump and the radial outer edges of the blades of the turbine to a second space enclosed by the respective core portions of the pump and turbine so that the amount of the hydraulic fluid flowing from the first space to the second space is greater in a low engine speed region than in a high engine speed region.

* * * * *